United States Patent

[11] 3,617,847

[72] Inventor Frederick W. Powell
    Rochester, N.Y.
[21] Appl. No. 14,745
[22] Filed Feb. 24, 1970
[45] Patented Nov. 2, 1971
[73] Assignee Eastman Kodak Company
    Rochester, N.Y.
    Continuation of application Ser. No.
    730,442, May 20, 1968, now abandoned.

[54] SPEED REGULATING ELECTRONIC CIRCUIT FOR DC MOTOR CONTROL
    1 Claim, 2 Drawing Figs.
[52] U.S. Cl. .................................................. 318/345,
    323/23
[51] Int. Cl. .................................................. H02p 5/16
[50] Field of Search .......................................... 318/327,
    345; 330/18; 323/22 T, 75 E, 23; 317/33

[56] References Cited
    UNITED STATES PATENTS
    3,237,087  2/1966  Greenberg .................. 323/22 T
    3,381,199  4/1968  Persson ....................... 318/327

Primary Examiner—Oris L. Rader
Assistant Examiner—Robert J. Hickey
Attorneys—Robert W. Hampton and James J. Wood ABSTRACT: This invention relates to a speed regulating electronic circuit for a DC motor. A tachometer generator, driven by the armature shaft of the DC motor, provides a voltage signal which is a function of the instantaneous speed of the motor. The tachometer generator output voltage is combined with a reference voltage which is a function of the desired speed, and the difference is applied to a plurality of amplifiers in cascade to develop a DC potential level which is applied across $n$ equal resistors connected in series to provide $n$ voltage drops, where $n$ is an integer selected from the series 2,3,4,.........$n$. These $n$ voltage drops are applied to a first set of $n$ transistor amplifiers connected in cascode, and the $n$ outputs which they provide are applied to a second set of $n$ transistors connected in cascode and in series with the motor armature. This arrangement insures that each transistor of the second set of $n$ transistors will dissipate equal power, regardless of armature load current demand, with concomitant advantages in increased efficiency and lower costs.

FIG. I

FREDERICK W. POWELL
INVENTOR.

SPEED REGULATING ELECTRONIC CIRCUIT FOR DC MOTOR CONTROL

CROSS-REFERENCES TO RELATED APPLICATIONS

This is a continuation of application, Ser. No. 730,442, filed May 20, 1968, now abandoned.

BACKGROUND OF THE INVENTION

This invention relates to a speed regulating electronic circuit for a DC electric motor. The overall technique of using a tachometer generator to develop an error signal for providing a corrective signal for motor speed control is well known in the art. Further, the advantages, of using solid state circuitry, are, of course, well known. When transistors are used in the output circuit of regulator circuitry, and the transistors experience unequal loading, the maximum power that can be safely dissipated is limited by that power that can be dissipated by a single transistor. The net result is that the overall power that may be dissipated and hence the efficiency of the system, is limited by the rating of a single transistor. The prior art has overcome this limitation by using specially designed power transistors, matching transistors and similar techniques.

SUMMARY OF THE INVENTION

The instant invention provides means whereby the output transistors in a speed regulator circuit will experience equal power dissipation, regardless of the varying demands of armature load current. As a result of this, each transistor may be utilized to its maximum power dissipation rating, and therefore, the overall power that can be safely dissipated will be greatly increased. The arrangement in accordance with the invention is such that it is unnecessary to match transistors, use specially constructed transistors, or in any other way pay a higher price for the desired efficiency.

A number $n$ (where $n \geq 2$) of resistors of equal ohmic value, are connected in series and adapted to provide equal DC voltage drops. A first set of $n$ transistors connected in cascode is adapted to receive these voltage drops and deliver $n$ equal outputs to a second set of $n$ transistors arranged in cascode and connected in series with the armature of the motor. With this arrangement, the power dissipated by each of the second set of $n$ transistors is at all times equal regardless of the demands of the armature load current.

Accordingly, it is an object of this invention to provide an electronic speed control circuit for a DC motor in which the output transistors in the speed regulator circuitry dissipate equal power at all times, regardless of the vicissitudinous demands of armature load current under field conditions.

The novel features which are believed to be characteristic of the invention are set forth with particularity in the appended claims. The invention itself, however, both as to its organization and method of operation, together with further objects and advantages thereof, may be understood by reference to the following description, taken in connection with the accompanying drawings.

DESCRIPTION OF THE PREFERRED EMBODIMENT

Figure 1:
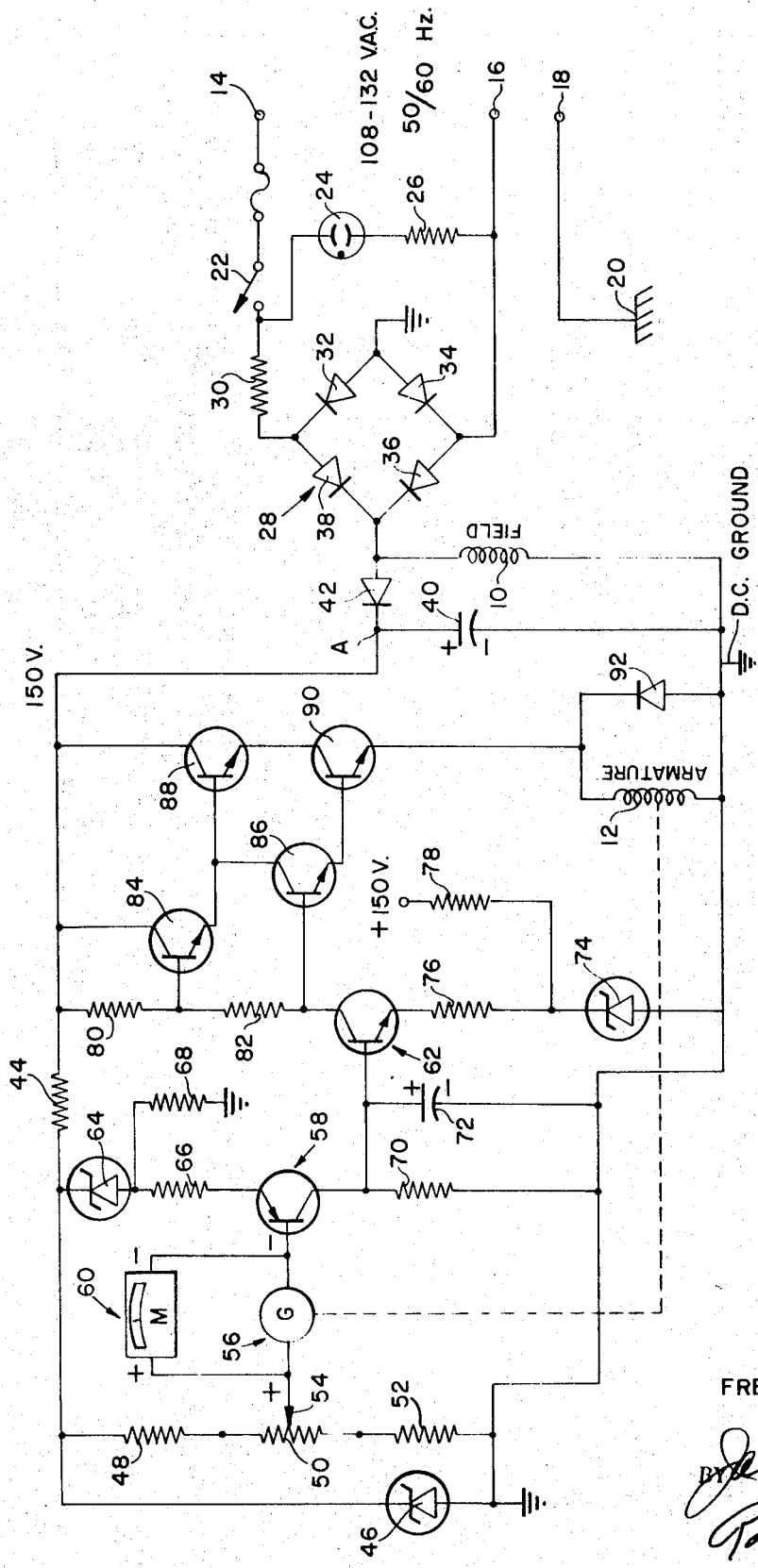
FIG. 1 is an electrical schematic showing the electronic control circuit for a DC motor speed control in accordance with the invention.

Referring now to FIG. 1, the invention is here illustrated as being used to regulate the speed of a DC shunt wound motor. In the interests of clarity, only the armature and field windings are shown. The DC shunt motor has a field winding indicated at 10 and an armature 12. The electric power for the motor is derived from supply mains which may be 108 to 132 volts AC at 50–60 Hz. through input terminals 14,16. Terminal 16 is the AC neutral, while terminal 18 is connected to chassis ground at 20. The remaining ground indications on the schematic are for DC common. The circuitry is energized by closing the switch 22. A neon glow lamp 24 indicates to the regulator circuitry user that the circuit is energized; the lamp 24 is connected across the supply main through a resistor 26.

The hot side of the AC supply is connected to a full wave bridge circuit indicated generally at 28, through a resistor 30. The full wave bridge rectifying circuit 28 includes diodes 32,34,36,38, in the bridge arms. The output of the bridge rectifying circuit is directly connected across the field winding 10, as may be seen from a study of FIG. 1. A diode 42 has its anode connected to one output of the bridge circuit 28. An electrolytic capacitor 40, has its positive side (+) connected to the cathode of diode 42 and its negative side connected to ground. The filtered output appearing at A (which is 150 volts with respect to ground) is connected through resistor 44 to a zener diode 46 which is connected in series with resistor 44 and to ground, as shown. The serial combination of resistor 48, potentiometer 50, and resistor 52 is connected across the zener diode 46. The zener diode 46 then supplies about a 51 volt drop across the series combination 48,50,52. The variable tap 54 on the potentiometer 50 is connected to the positive side of a DC tachometer, indicated generally at 56; the negative side of the DC tachometer 56 is connected to the base of a PNP transistor 58. A meter 60, which may be conveniently calibrated in r.p.m. or volts is connected across the tachometer generator 56.

The transistor 58 and and NPN transistor 62 are connected in amplifying arrangement. A zener diode 64 has its anode connected to the emitter of transistor 58 through resistor 66, the cathode side being connected to resistor 44. The anode of diode 64 is also connected to ground through resistor 68. The zener diode 64 insures a voltage drop of about 24 volts and provides the operating potential $V_{ee}$ for the transistor 58.

The output of transistor 58 is developed across output resistor 70. An electrolytic capacitor 72, having the polarity indicated, is connected across the output resistor 70, and the parallel combination of resistor 70, and capacitory 72 are connected in the input of the transistor 62, being connected to the base thereof. The resistor 66 introduces negative feedback to the amplifier 58 and the capacitor 72 introduces a large phase shift to insure amplifier stability.

A zener diode 74, connected serially with negative feedback resistor 76, the serial combination being connected between the emitter of transistor 62 and DC ground. The cathode of zener diode 74 is connected to the +150 volt supply through resistor 78. Zener diode 74 makes the emitter of transistor 62 about 6.8 volts with respect to ground. The output circuit of the transistor 62 includes resistors 80,82 of equal ohmic magnitude serially connected with its collector. The midpoint of the resistor pair 80,82 is connected to the base of an NPN transistor 84. The NPN transistor pairs 84,86,88,90 are connected as emitter followers. The base of transistor 86 is connected to the collector of transistor 62, while the collector of transistor 86 is connected to the emitter of transistor 84 and to the base of transistor 88.

The transistors 88,90 are serially connected with the armature 12 of the DC shunt motor. A protective diode 92, having its anode side grounded is connected across the armature 12.

OPERATION OF THE CIRCUITRY

The bridge rectifying circuit 28 is conventional and supplies pulsating DC to the field winding 10, and filtered DC, by reason of diode 42 and filtering capacitor 40 to the amplifiers 58,62; 84,86; 88,90 and armature winding 12.

The DC tachometer generator 56 is also conventional and is connected to the armature shaft of the motor, and as such, develops a voltage which is a function of the instantaneous speed of the DC motor. The positive side of the tachometer generator 56 is connected to the potentiometer tap 54, so that by adjusting the potentiometer, a reference voltage is established which is directly related to the speed desired for the motor. In this practical embodiment, the motor speed may be adjusted through a range of approximately 10 to 1 by virtue of the potentiometer 50. The range of adjustment permitted is limited by the range of the potentiometer to insure linear operation at all times. A standard or reference voltage is provided by the tap 54 of the potentiometer 50, and this voltage is combined with the tachometer generator voltage to provide a difference voltage which is applied to the base of the transistor 58.

The input signal to the transistor 58 is a measure of how far the speed is deviating from the selected norm. The input to the base of transistor 58 is amplified by the transistors 58 and 62, the amplifying voltage appearing as a DC potential level across resistors 80, 82. This DC voltage level is then divided across the equal resistors 80 and 82 to supply voltage levels to the respective bases of transistors 84 and 86.

Figure 2:
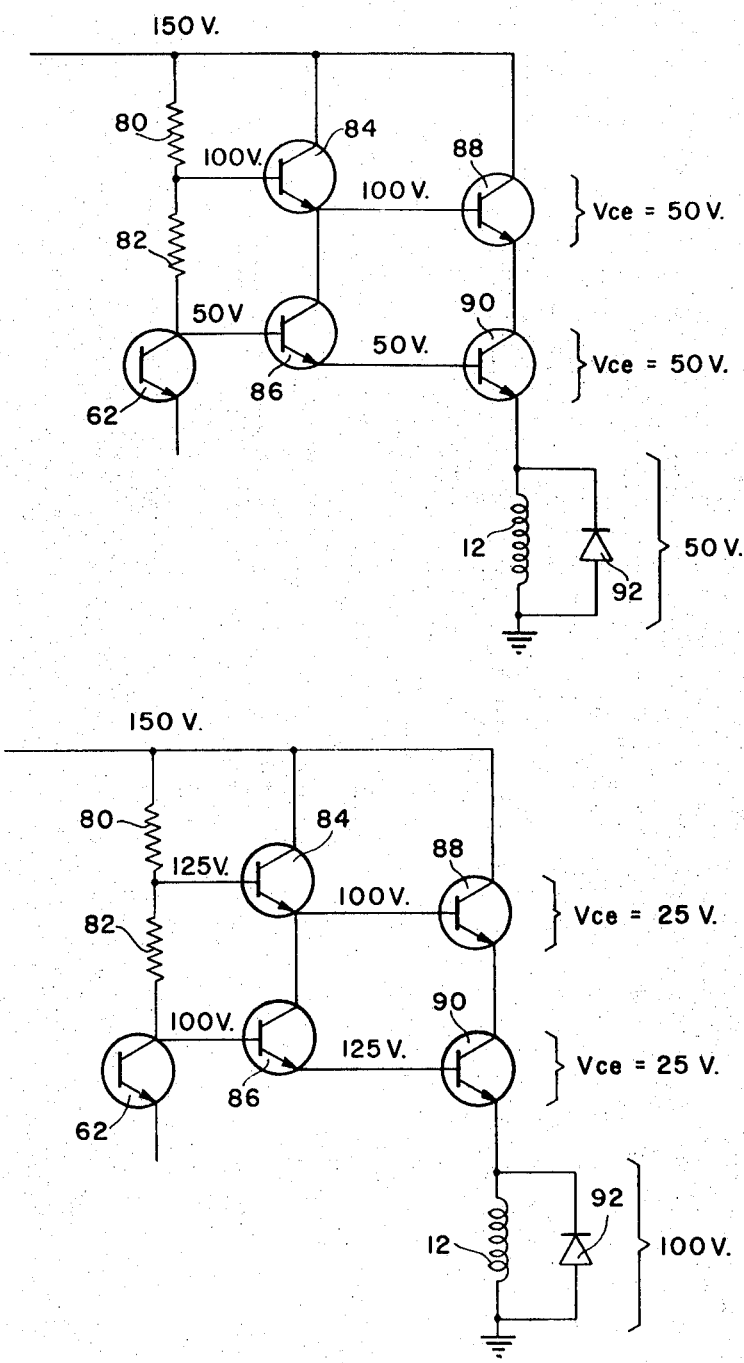
FIG. 2 is a schematic used in explanation of the operation of the circuitry of FIG. 1.

The divided collector load of transistor 62, provided by the resistors 80, 82 enables the power dissipated by the output transistors 88 and 90 to be always equal. This may be appreciated from a study of FIG. 2, where 150 volts being supplied to the transistor amplifiers. Assume first that the voltage across the armature 12 is 50 volts. If 50 volts is dropped across the resistor 80, this would make the input to the base of transistor 84, 100 volts. Another 50 volt drop across the resistor 82 makes the voltage to base of transistor 86 approximately 50 volts. During periods of conduction, the base and emitter are approximately the same voltage, so that the input to the base of transistor 88 will be approximately 100 volts, and the input to the base of resistor 90 will be approximately 50 volts. Again, since the base and emitter are approximately the same voltage, 50 volts will appear across the armature and there will be exactly 50 volts appearing across each of transistors 88 and 90. Should conditions change, so that the voltage across the armature rose to 100 volts, 25 volts would now be dropped across each of resistors 80 and 82, and in the same manner following through the voltages, it is seen that 25 volts now appears across each of the transistors 88, 90.

The transistor power dissipation equals the armature current times $V_{ce}$. Since the armature current flows through the transistors 88, 90, and since the voltage across each transistor is the same, therefore, the power dissipated in each of the transistors 88 and 90 is always the same. This arrangement makes possible the most efficient use of the power dissipation rating of a transistor, and will always equalize the power, regardless of the gain of the particular transistor.

The advantages of equal power dissipation of these transistors utilizing the instant invention, makes for greater efficiency and lower costs in the selection of transistors. First, the transistors selected need not be matched and hence, off-the-shelf transistors may be utilized. Second, if one transistor of a cascoded pair were required by unequal loading demands to exceed the power dissipated by the other of the pair, then obviously, the total power that could be dissipated by the circuit would be limited by the power rating of the transistor, then experiencing the greater power demands, so that the maximum power that could be dissipated would have to be somewhat lowered.

The principles of the instant invention are obviously not limited to a cascoded pair of transistors in the armature circuit, and $n$ transistors could be used where $n$ is an integer selected from the series 2,3,4,..............$n$. Instead of the equal collector resistors 80, 82, $n$ resistors of equal ohmic valve would be required, and a set of $n$ transistors (similar to transistors 84, 86) would be required to receive the equal voltage drops afforded by the $n$ equal resistors.

This invention has been described in detail with particular reference to preferred embodiments, but it will be understood that variations and modifications can be effected within the spirit and scope of the invention, as described herein and as defined in the appended claims.

I claim:

1. A circuit adapted to regulate the rotational velocity of an output shaft of a DC motor having an armature winding, said circuit comprising:
   a. a power supply for producing an AC output signal;
   b. a signal converter network connected to said power supply for converting the AC signal produced by said supply into a DC signal;
   c. variable circuit means for producing a reference signal having a predetermined value from said DC signal, said circuit means including means for regulating the magnitude of said reference signal to correspond to the desired rotational velocity of the output shaft;
   d. a transducer for generating a DC signal related to the rotational velocity of the shaft;
   e. means for comparing said reference signal generated by said variably circuit means to said DC signal generated by said transducer wherein a DC control signal having a magnitude equal to the difference between said reference signal and said DC signal is generated;
   f. a DC voltage-amplifying transistor network comprising an input transistor stage responsive to said DC control signal and an output transistor stage for producing a DC signal related to said DC control signal;
   g. $n$ resistors of equal ohmic magnitude connected in series with said output transistor stage whereby $n$ equal voltages are dropped across said $n$ resistors whose magnitudes are related to said DC signal generated at the output of said transistor network, $n$ being an integer selected from the series 2, 3, 4, ..., $n$;
   h. a first set of $n$ transistor amplifiers connected in cascode and adapted to receive said $n$ equal voltages as $n$ inputs and to produce $n$ voltage outputs respectively; and
   i. a second set of $n$ transistor amplifiers connected in cascode and adapted to received as inputs said $n$ voltage outputs from said first set of $n$ transistor amplifiers and to produce $n$ voltage outputs respectively, said second set of $n$ transistors being connected in series with the armature winding so that each of said $n$ transistor amplifiers in said second set can be utilized to its maximum power dissipation rating and whereby the power dissipated in each of said $n$ transistors in said second set is substantially equal regardless of the load current through the armature winding.

* * * * *